US012406633B2

(12) United States Patent
Sung et al.

(10) Patent No.: US 12,406,633 B2
(45) Date of Patent: Sep. 2, 2025

(54) ENHANCED COLOR GAMUT PERFORMANCE OF A LIQUID CRYSTAL DISPLAY

(71) Applicant: DELL PRODUCTS L.P., Round Rock, TX (US)

(72) Inventors: Seungjae Sung, Singapore (SG); Yonggu Kang, Singapore (SG); Bongjun Lee, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/423,591

(22) Filed: Jan. 26, 2024

(65) Prior Publication Data

US 2025/0246163 A1 Jul. 31, 2025

(51) Int. Cl.
*G09G 3/36* (2006.01)

(52) U.S. Cl.
CPC ... *G09G 3/3607* (2013.01); *G09G 2320/0276* (2013.01); *G09G 2320/0626* (2013.01)

(58) Field of Classification Search
CPC ...... G09G 3/36; G09G 3/3607; G09G 3/3611; G09G 3/3614; G09G 3/3622; G09G 3/3625; G09G 3/3633; G09G 3/364; G09G 3/3644; G09G 3/3648; G09G 3/3655; G09G 3/3659; G09G 3/3666; G09G 3/3674; G09G 3/3677; G09G 3/3681; G09G 3/3685; G09G 3/3688; G09G 3/3692; G09G 3/3696; G09G 2320/0626
USPC .................................................... 345/87–104
See application file for complete search history.

(56) References Cited

U.S. PATENT DOCUMENTS

| | | | | |
|---|---|---|---|---|
| 7,717,601 | B2 | 5/2010 | Tan et al. | |
| 8,638,288 | B2 | 1/2014 | Taylor et al. | |
| 10,832,625 | B2 * | 11/2020 | Wang | G09G 3/3607 |
| 11,244,591 | B2 * | 2/2022 | Yu | G09G 3/2003 |
| 2008/0198151 | A1 * | 8/2008 | Lee | G09G 3/36 345/207 |
| 2009/0102781 | A1 * | 4/2009 | Chien | G09G 3/3406 345/102 |
| 2009/0267968 | A1 * | 10/2009 | Liao | G09G 3/3611 345/89 |
| 2010/0033513 | A1 * | 2/2010 | Choi | G09G 3/3611 345/82 |
| 2010/0128064 | A1 | 5/2010 | Taylor et al. | |
| 2010/0165002 | A1 * | 7/2010 | Ahn | G09G 3/3648 345/102 |
| 2010/0182346 | A1 * | 7/2010 | Sano | G09G 3/3413 345/690 |
| 2011/0122057 | A1 * | 5/2011 | Kim | G09G 3/3648 345/102 |

(Continued)

*Primary Examiner* — Ke Xiao
*Assistant Examiner* — Nelson Lam
(74) *Attorney, Agent, or Firm* — Larson Newman, LLP

(57) ABSTRACT

An information handling system determines an expansion ratio based on a highest grayscale value of a raw image and a maximum grayscale value, and modifies at least one grayscale value associated with the raw image prior to display at a display panel, wherein the modifying of the grayscale value is based on the expansion ratio, and wherein the highest grayscale value is updated with the maximum grayscale value. The system adjusts backlight intensity based on a gamma correction curve to adjust a pixel transmittance of the display panel.

20 Claims, 5 Drawing Sheets

(56) References Cited

U.S. PATENT DOCUMENTS

| | | | | |
|---|---|---|---|---|
| 2011/0141004 | A1* | 6/2011 | Kwon | G09G 3/3426<br>345/102 |
| 2011/0227957 | A1* | 9/2011 | Jung | G09G 3/3426<br>345/102 |
| 2013/0141409 | A1* | 6/2013 | Kosei | G09G 3/006<br>345/207 |
| 2020/0135147 | A1* | 4/2020 | Tang | G09G 5/10 |
| 2021/0003886 | A1 | 1/2021 | Kang et al. | |
| 2021/0021791 | A1* | 1/2021 | Wang | G09G 3/3648 |
| 2021/0049966 | A1* | 2/2021 | Hsu | G09G 5/10 |
| 2021/0158766 | A1* | 5/2021 | Zhao | G09G 3/36 |

* cited by examiner

ENHANCED COLOR GAMUT PERFORMANCE OF A LIQUID CRYSTAL DISPLAY

FIELD OF THE DISCLOSURE

The present disclosure generally relates to information handling systems, and more particularly relates to enhanced color gamut performance of a liquid crystal display.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system determines an expansion ratio based on a highest grayscale value of a raw image and a maximum grayscale value, and modifies at least one grayscale value associated with the raw image prior to display at a display panel, wherein the modifying of the grayscale value is based on the expansion ratio, and wherein the highest grayscale value is updated with the maximum grayscale value. The system adjusts backlight intensity based on a gamma correction curve to adjust a pixel transmittance of the display panel.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
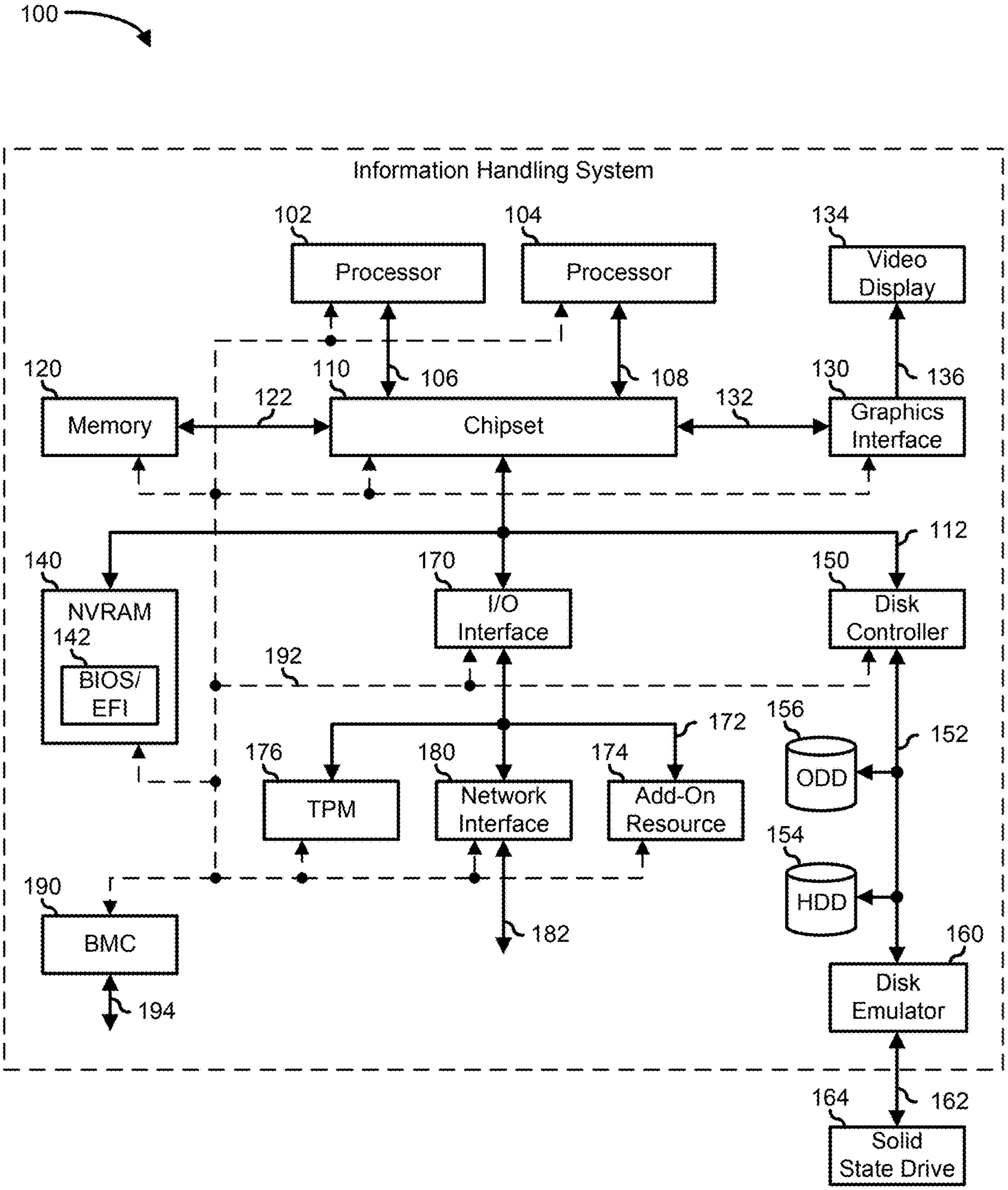
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a “F2” boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

One issue with liquid crystal displays is that their color gamut typically narrows as the grayscale becomes darker. Liquid crystal displays use a backlight as a source for light emission and liquid crystals control the light’s transmittance. Due to structural limitations, these displays generally cannot completely block the backlight resulting in light leakage. The light leakage may result in result in color purity degradation such as when red, green, and blue colors are displayed individually. For example when the red color is displayed, the green and blue colors should not emit light. However, the light leakage typically occurs in the green and blue colors and the light emitted by the green and blue colors can mix. This causes color purity and coordinates distortion of the red color.

Generally, the color gamut degradation begins at around sixty-four grayscale and becomes almost zero at around four grayscale value. This means that the color may get distorted when the liquid crystal display device displays red, green, and blue colors below the sixty-four grayscale value. In this example the lower the grayscale, the red color coordinates get closer to the white color coordinates which causes a reduction in color space. This in turn may cause difficulty in distinguishing between the red, green, and blue colors. To address these and other concerns, the present disclosure provides a system and method for enhanced color gamut performance in a liquid crystal display.

Figure 2:
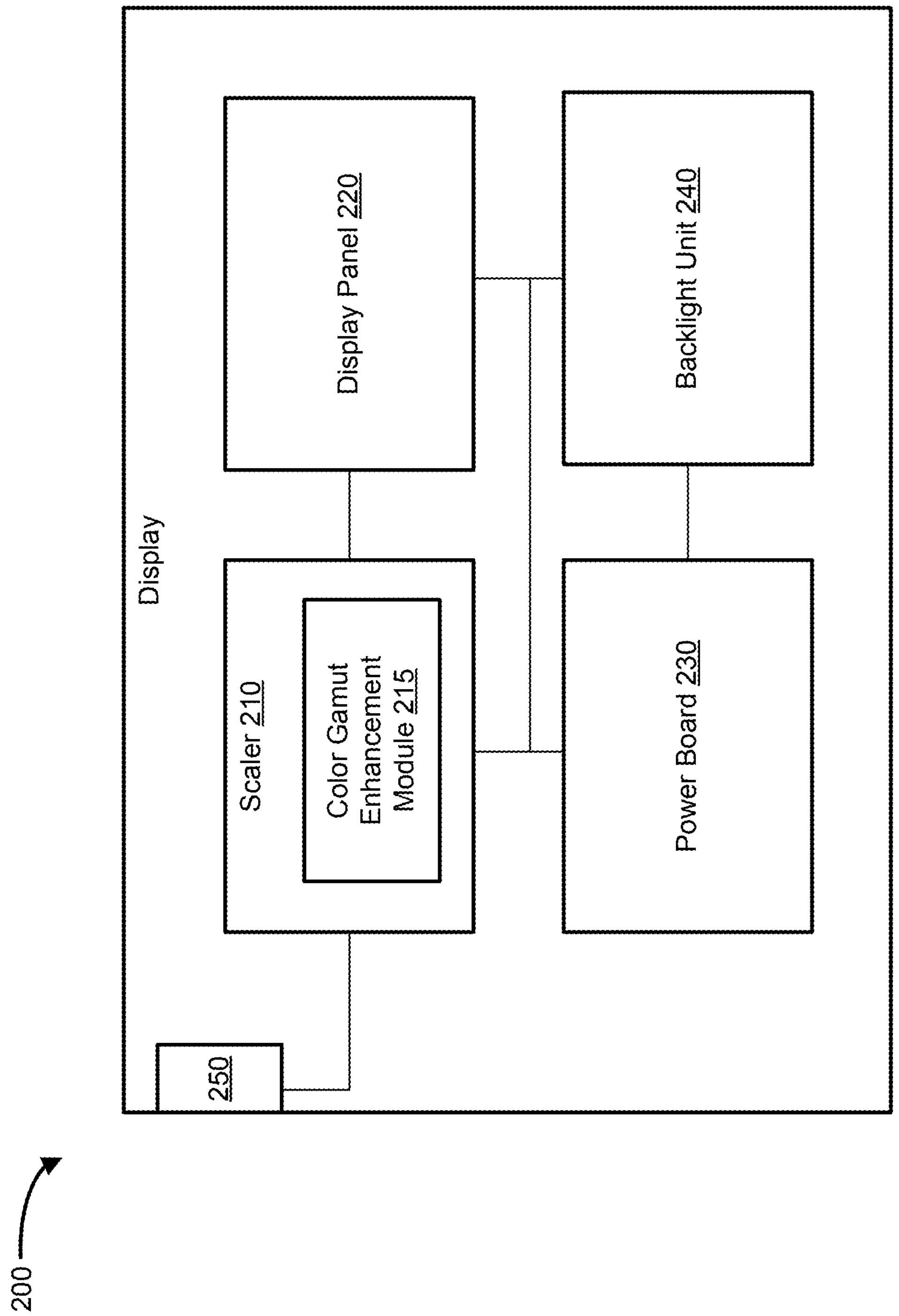
FIG. 2 is a block diagram of a display that is configured for enhanced color gamut performance, according to an embodiment of the present disclosure.

FIG. 2 shows a display 200 that is configured for enhanced color gamut performance. Display 200 includes a scaler 210, a display panel 220, a power board 230, a backlight unit 240, and a display port 250. Scaler 210 includes a color gamut enhancement module 215. Scaler 210, display panel 220, power board 230, backlight unit 240, and display port 250 may be communicatively coupled with each other. The components of display 200 may be implemented in hardware, software, firmware, or any combination thereof. In addition, the components shown are not drawn to scale, and display 200 may include additional or fewer components. Further, connections between components may be omitted for descriptive clarity.

Display 200, which is similar to video display 134 of FIG. 1, maybe a liquid crystal display that is used to display information to a user. Display 200 may be integrated into an information handling system. In another embodiment, display 200 may be an external display device, such as a display monitor. Scaler 210 may be configured to provide support for inputs from different image formats, such as video graphics array, display port, digital visual interface, high-definition multimedia interface, etc. In one example, scaler 210 may receive raw image data from display port 250. Scaler 210 may process the raw image data for resolution, refresh rate, and color optimization. Also, scaler 210 may decode the received image format into a digital pixel format. In addition, scaler 210 may be configured to convert the resolution of the received image to a resolution of display 200. For example, scaler 210 may upscale or downscale the resolution of the received image to accommodate the resolution of display 200. As the received image is upscaled or downscaled, scaler 210 may process the received image to adjust for refresh rate and color.

Color gamut enhancement module 215 may include an algorithm to enhance the color gamut of display 200 by minimizing light leakage by minimizing backlight intensity and maximizing liquid crystal transmittance. The algorithm may perform a conversion of the current and/or voltage provided to backlight unit 240 and adjust grayscale values of the image data based on a gamma correction curve which is discussed in further detail in FIG. 4. In particular, color gamut enhancement module 215 may convert the greyscale values of a received image prior to outputting a final image for display panel 220.

Color gamut enhancement module 215 may also be configured to update a pulse width modulation (PWM) signal value it provides to power board 230. The PWM signal value may be used by power board 230 to determine a current and/or voltage provided to backlight unit 240. The current may be used to adjust or drive the backlight intensity provided by backlight unit 240, such as to dim or increase the brightness of backlight unit 240. For example, the higher the current output to backlight unit 240, the brighter the light output of backlight unit 240. Conversely, the lower the current output to backlight unit 240, the dimmer the light output of backlight unit 240.

In another embodiment, the brightness provided by backlight unit 240 may be controlled by adjusting the on/off ratio. For example, to achieve 70% brightness, the digital signal may be kept on for 70% of the time and off for 30% of the time the display panel is on. This is typically done rapidly, such as a certain frequency per second. In one embodiment, color gamut enhancement module 215 may be configured to perform the conversions in real-time. In another embodiment, a set of look-up tables may be generated during the production of display 200 and stored in a non-volatile memory that is accessible by color gamut enhancement module 215. The set of lookup tables may include grayscale values and backlight intensity values that color gamut enhancement module 215 may use during the conversion.

Power board 230 may be configured to provide power to backlight unit 240. Power board 230 may receive the PWM signal from scaler 210 and can output current and/or voltage to backlight unit 240 based on the PWM signal. Backlight unit 240 may be configured to illuminate the liquid crystal material to provide a contrast between the light transmissive and opaque portions of display 200. Backlight unit 240 may be a cool cathode fluorescent light, several light-emitting diodes, an electroluminescent panel, or any other suitable device. Backlight unit 240 may be an edge-type backlight unit or a direct-type backlight unit.

Display panel 220 may be a liquid crystal display that can modulate light to create images using selectively transmissive and opaque portions of the display by passing an electrical current through a liquid crystal material. Display 114 may have a display surface that includes multiple pixels. Each pixel in display 200 may include liquid crystal molecules suspended between two transparent electrodes that are in turn sandwiched between two polarizing filters whose axes of transmission may be perpendicular to each other. By applying voltage to the transparent electrodes over each pixel, the corresponding liquid crystal molecules may allow varying degrees of light to pass through the polarizing filters. Each pixel may be composed of individual red, green, blue (RGB), and/or other color sub-pixels. In addition, each pixel is assigned a value of grayscale level between 0 and 255.

Those of ordinary skill in the art will appreciate that the configuration, hardware, and/or software components of display 200 depicted in FIG. 2 may vary. For example, the illustrative components within display 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
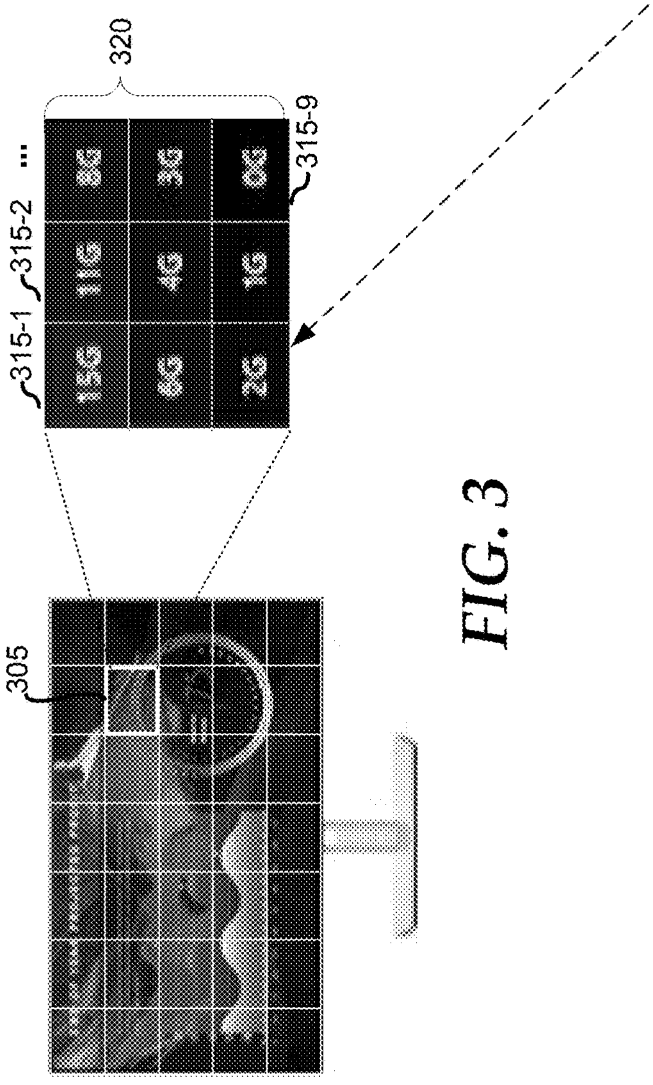
FIG. 3 is a block diagram of a display with a display panel that has been divided into local area units, according to an embodiment of the present disclosure.

FIG. 3 shows display 200 with a display panel that has been divided into a plurality of local area units, wherein each local area unit may be subdivided further into sub-units. Each subunit may include one or more pixels. Each local area unit and sub-unit may be of equal size. In this example, display panel 220 is divided into 35 local area units while each local area unit, such as a local area unit 305 is divided into nine subunits, 315-1, 315-2, through 315-9. Each local area unit may be associated with grayscale settings which are based on the raw image data. For example, local area unit 305 includes grayscale settings 320 that further include various grayscale values, wherein each subunit may be associated with a particular grayscale value. The grayscale value may be the same or different from the grayscale values of other subunits. In this example, subunit 315-1 has a 15 grayscale, 315-2 has 11 grayscale, and subunit 315-9 has 0 grayscale, and so on. In addition, backlight unit 240 disposed behind display panel 220 may also be divided into local area units and subunits similarly to display panel 220, wherein each local area unit of display panel 220 has a corresponding backlight local area unit.

Figure 4:
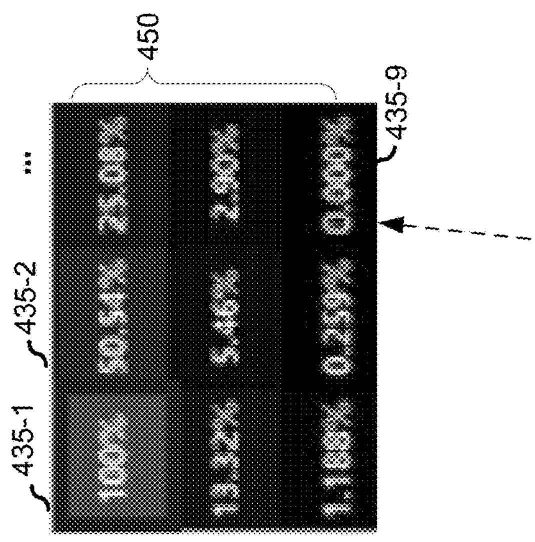
FIG. 4 is a block diagram of modified display settings for enhanced color gamut performance of a liquid crystal display, according to an embodiment of the present disclosure.
Figure 4:
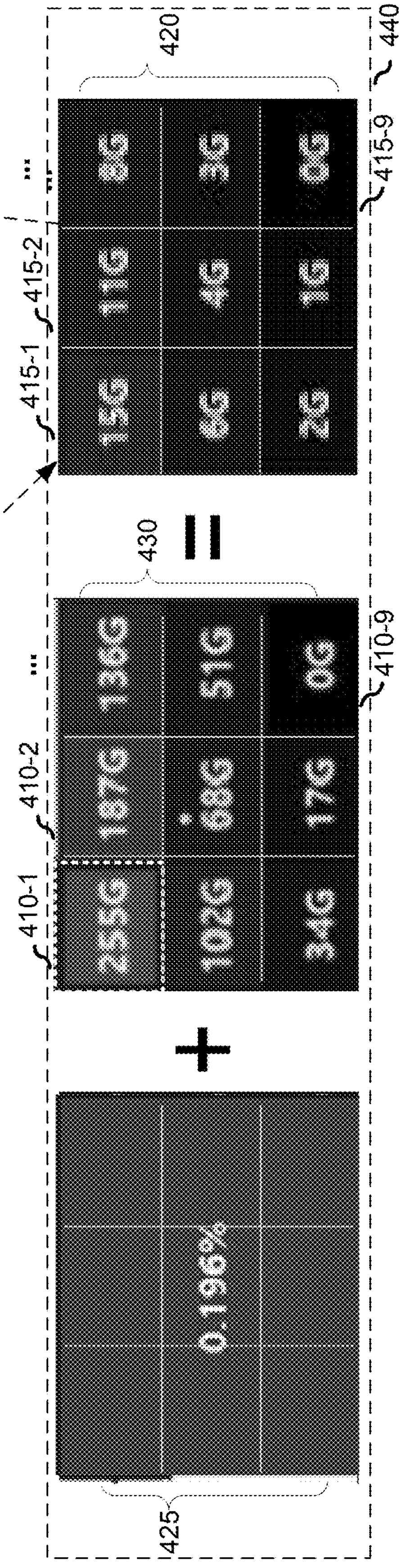

FIG. 4 shows modified display settings for enhanced color gamut performance of a liquid crystal display. The modified display settings include display settings 440 and pixel transmittance values 450. Display settings 440 include backlight intensity settings 425 for a local area unit of backlight unit 240 of FIG. 2. Backlight intensity settings 425 may be modified from a static backlight intensity setting of 100%. A local area unit of a backlight unit may be disposed on the back side of local area unit 305 of display panel 220. Display settings 400 also include grayscale settings 420 for local area unit 305 which can be modified settings based on grayscale settings 320 of FIG. 3. The conversion algorithm for converting the backlight intensity settings and the grayscale settings from their initial values is discussed below.

Converting grayscale settings 320 to grayscale settings 420 includes replacing the highest grayscale value of grayscale settings 320 to a maximum grayscale value of 255G. The conversion is applied to each subunit of each local area unit. This may be done to maximize liquid crystal transmittance as depicted in pixel transmittance values 450 and to calculate an expansion ratio. The expansion ratio may relate to an expansion liquid crystal operation range. For example, typically a gramma curve, such as a 2.2 gamma curve is applied to raw image data based on the grayscale value of each subunit. In this example, the grayscale value of subunit 315-1 is 15G, which is also the highest grayscale value in local area unit 305. This grayscale value may be increased to the maximum grayscale value of 255G.

Figure 5:
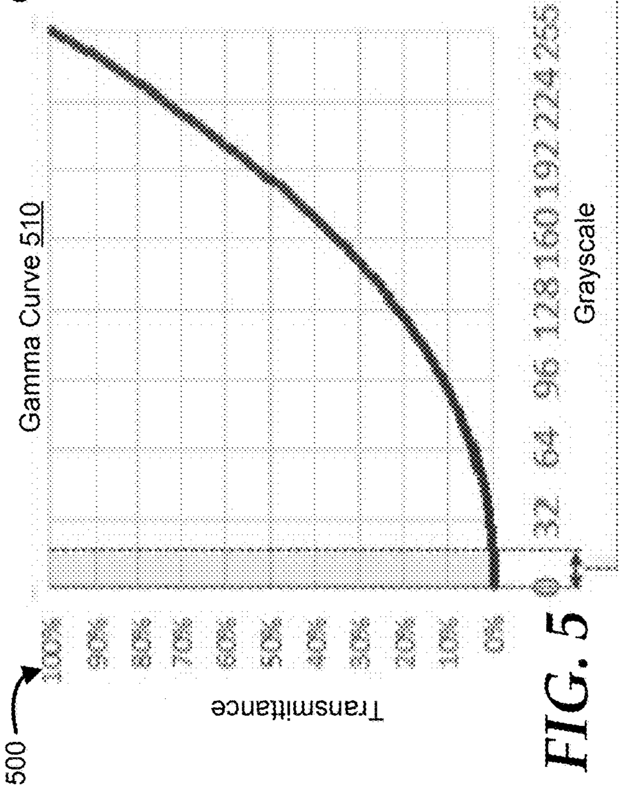
FIGS. 5 and 6 are diagrams of plots of gamma curves for a display, according to an embodiment of the present disclosure.
Figure 6:
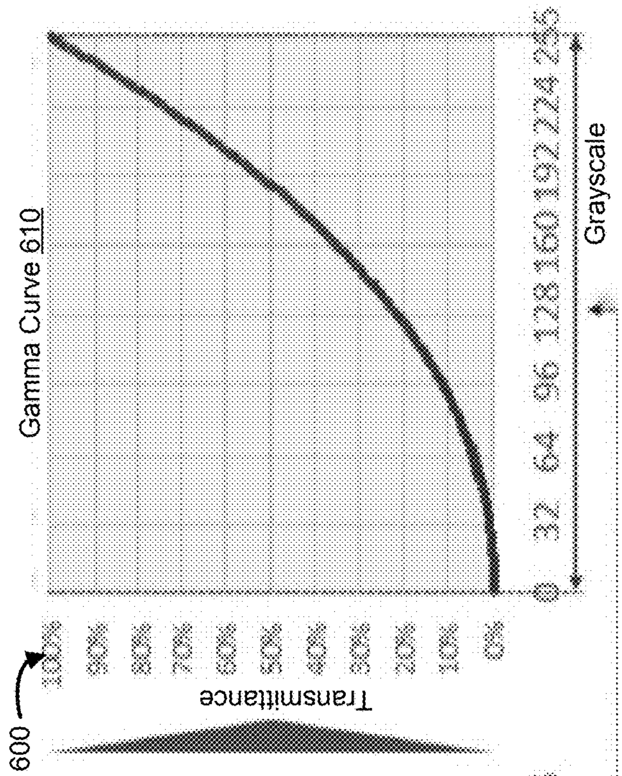

Accordingly, gamma correction can then be applied from a grayscale range of 15G to 255G as depicted in FIG. 5 and FIG. 6. Thus, the expansion ratio is 255G/15G which equals 17. The expansion ratio can be used in converting each remaining grayscale value of each subunit of the local area units of display 200. For example, the grayscale value of subunit 315-2 may be converted from 11G to 187G, wherein 187G is calculated from 11G*17. Similarly, the grayscale value of subunit 315-0 may be converted from 0G to 0G, wherein 0G is calculated from 0G*17.

The current for backlight light elements associated with each subunit of the local area units of backlight unit 240 may be adjusted or converted. The conversion may include dimming the backlight intensity for that subunit from a typical static backlight intensity of 100%. The conversion may be based on a formula: (grayscale value of the subunit/maximum grayscale value)^2.2, wherein 2.2 is based on a conventional gamma curve, although other gamma curves may be used. Accordingly, the subunit with the highest grayscale value may also have the highest backlight intensity and highest pixel transmittance as depicted in backlight intensity settings 425 and pixel transmittance values 450. For example, for subunit 315-1, the current for backlight elements for a particular subunit may be adjusted such that its backlight intensity is equal to 0.196%, which is calculated from (15/255)^2.2. Accordingly, the backlight intensity of the rest of the subunits may be adjusted such that the backlight intensity of each subunit is equal to 0.196%, which is based on the subunit with the highest grayscale.

The combination of the backlight intensity settings 425 and grayscale settings 430 may result in modified grayscale settings 420 which are similar to initial grayscale settings 320. Further, the combination of the backlight intensity settings 425 and grayscale settings 420 may result in pixel transmittance values 450. Pixel transmittance values 450 may also be calculated based on the gamma curve. Assuming that 225G results in 100% pixel transmittance and 0G results in 0% pixel transmittance, then calculating the pixel transmittance of the subunits may be based on its (grayscale setting/maximum grayscale setting)^2.2 gamma curve. For example, pixel transmittance 435-1 may be determined to be 100%, and pixel transmittance 435-9 to be 0%. In addition, pixel transmittance 435-2 may be determined to be (185G/255G)^2.2 which results in 50.54%. The modified backlight intensity, grayscale settings, and pixel transmittance should result in an improvement of the color gamut. In addition, because of adjustments or reductions to the current provided to backlight unit 240, the power consumption of display 200 may be reduced.

FIG. 5 shows a plot 500 of a gamma curve 510 for display 200 of FIG. 3. Gamma curve 510 indicates pixel transmittance in percentages as a function of pixel grayscale level which can vary from 0 to 255. In this example, gamma curve 610 is a 2.2 gamma curve applied to a grayscale range of 0 to approximately 15G, which is the highest grayscale for local area unit 305 of FIG. 3.

FIG. 6 shows a plot 600 of a gamma curve 610 for display 200 of FIG. 3, wherein gamma curve 610 is a 2.2 gamma curve which is applied to an expanded grayscale range of 0 to approximately 255G, which is the maximum grayscale value. Accordingly, the expansion ratio may be based on the highest grayscale/maximum grayscale. In this example, the expansion ratio of 15G/255 is equal to 17.

Figure 7:
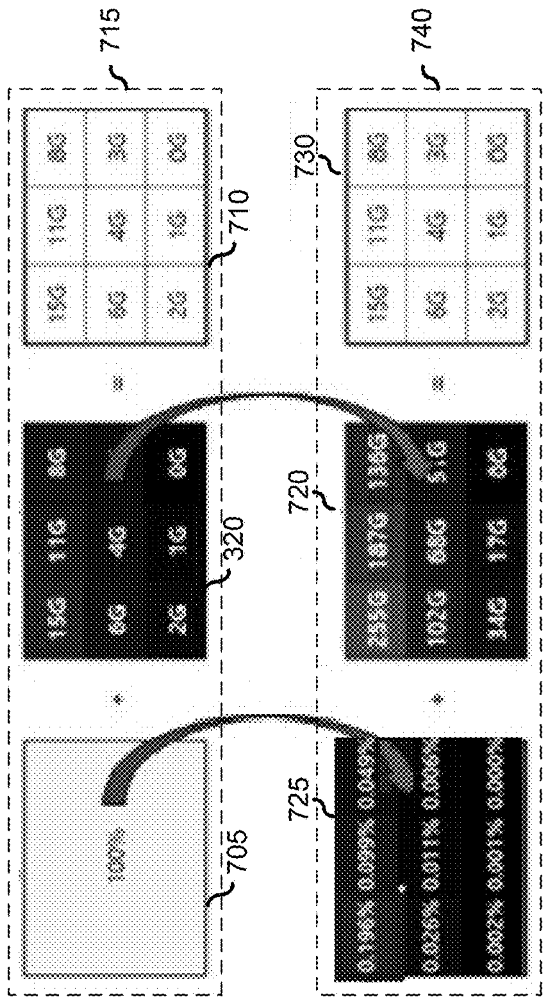
FIG. 7 is a diagram of grayscale value and backlight intensity conversion for an enhanced color gamut performance of liquid crystal display, according to an embodiment of the present disclosure.

FIG. 7 shows a grayscale value and backlight intensity conversion for an enhanced color gamut performance of liquid crystal display. This example includes display settings 715 and modified display settings 740. Display settings 715 may be based on gamma curve 510 of FIG. 5 while display settings 740 can be based on gamma curve 610 of FIG. 6. Display settings 715 include backlight intensity settings 705, grayscale settings 320, and grayscale settings 710. Backlight intensity settings 705 which are set to 100% for a local area unit of backlight unit 240 of FIG. 2. In this example, the backlight intensity of 100% is static and of the same value regardless of grayscale settings. The associated local area unit may be disposed on the back side of local area unit 305 of display panel 220. Grayscale settings 320 of local area unit 305 include various grayscale settings for each subunit. The combination results in grayscale settings 710, which can be desired grayscale settings.

Color gamut enhancement module 215 may convert display settings 715 to display settings 740 which are similar to display settings 440 of FIG. 4. Display settings 740 include backlight intensity settings 725, grayscale settings 720, and grayscale settings 730. Backlight intensity settings 725 are similar to backlight intensity settings 425. Grayscale settings 720 are similar to grayscale settings 420 and grayscale settings 730 are similar to grayscale settings 420. Backlight intensity settings 725 include different backlight intensities for each subunit of a local area unit. This is instead of having 100% backlight intensity for each subunit. The conversion from backlight intensity settings 705 to backlight intensity settings 725 may be calculated as shown in FIG. 4. Similarly, the conversion from grayscale settings 320 to grayscale settings 720 was shown in FIG. 4. Accordingly, the combination of backlight intensity settings 725 and grayscale settings 720 results in grayscale settings 730 which is similar to grayscale settings 710.

Figure 8:
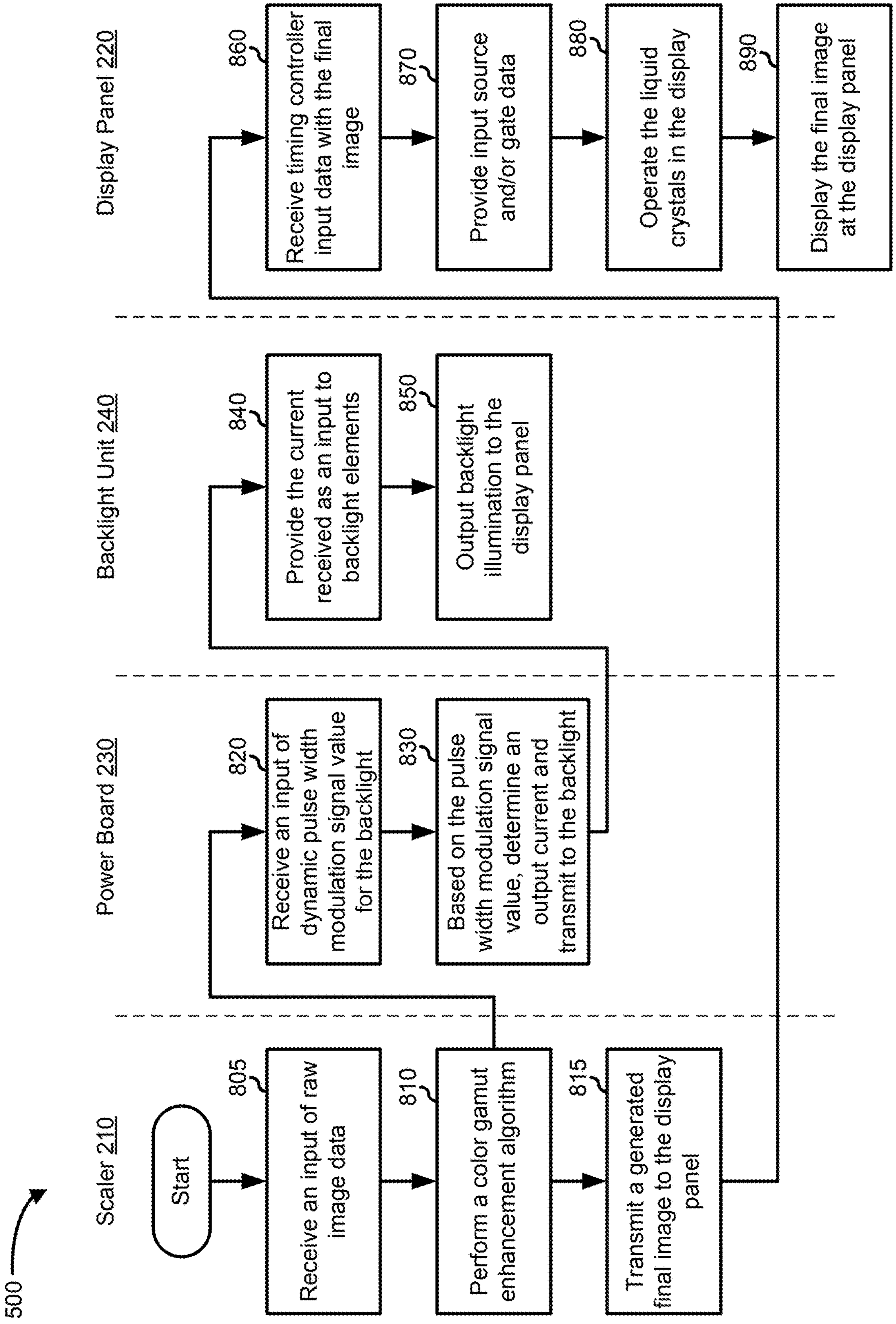
FIG. 8 is a flowchart of a method for enhanced color gamut performance of a liquid crystal display; according to an embodiment of the present disclosure.

FIG. 8 shows a flowchart of a method 800 for enhanced color gamut performance of a liquid crystal display. Method 800 may be performed by any suitable component including, but not limited to, scaler 210, display panel 220, power board 230, and backlight unit 240 of FIG. 2. It will be readily appreciated that not every method step set forth in this flow diagram is always necessary and that certain steps of the methods may be combined, performed simultaneously, in a different order, or perhaps omitted, without varying from the scope of the disclosure. While embodiments of the present disclosure are described in terms of display 200 of FIG. 2, it should be recognized that other systems may be utilized to perform the described method.

Method 800 typically starts at block 805 where scaler 210 receives an input of raw image data from display port 250.

The method proceeds to block 810 where scaler 210 may perform a color gamut enhancement algorithm as discussed in detail at FIG. 4. The color gamut enhancement algorithm is performed for color optimization of the received raw image data generating a final image for display. The color gamut enhancement algorithm may perform the calculations every time it receives a raw image, wherein a firmware associated with scaler 210, such as color gamut enhancement module 215, may be updated. In another embodiment, the color gamut enhancement algorithm may query a lookup table with pre-calculated values, such as backlight intensity values, grayscale values, and pixel transmittance values. For example, color gamut enhancement algorithm module 215 may query the value for adjusting the backlight intensity from a lookup table, wherein adjusting the backlight intensity includes minimizing the backlight intensity value. Color gamut enhancement algorithm module 215 may also query the value for adjusting the grayscale setting from the lookup table. Finally, color gamut enhancement algorithm module 215 may query the value for adjusting the pixel transmittance setting from a lookup table, wherein adjusting the pixel transmittance includes maximizing the pixel transmittance value. The lookup table may have a size of 255×100 entries that may show modified grayscale and backlight intensity settings.

The method proceeds to block 815 where scaler 210 may transmit the generated final image to display panel 220. The method also proceeds to transmit a dynamic backlight PWM signal to power board 230 at block 820. The value of the backlight PWM signal transmitted to power board 230 may change based on a desired backlight intensity and/or pixel transmittance, also referred to as liquid crystal transmittance. Determining the value of the desired pixel transmittance is discussed in detail in FIG. 4. The method proceeds to block 830 where power board 230 may determine an output current to be transmitted to backlight unit 240, wherein the output current is based on the value of the PWM signal received from scaler 210.

At block 840, backlight unit 240 may provide the current received as an input to backlight elements, such as an array of light-emitting diodes. The value of the current may determine the brightness of backlight unit 240 or portions thereof which are outputted at block 850. At block 860, display panel 220 receives the image data along with other data for the timing controller which may be used to convert the format of the image data prior to display. At block 870, display panel 220 may generate control signals for gate and source drivers which may be used to operate the liquid crystals in display panel 220 at block 880. The method proceeds to block 890 where the final image is outputted at display panel 220.

Although FIG. 8 shows example blocks of method 800 in some implementations, method 800 may include additional blocks, fewer blocks, different blocks, or differently arranged blocks than those depicted in FIG. 8. Those skilled in the art will understand that the principles presented herein may be implemented in any suitably arranged processing system. Additionally, or alternatively, two or more of the blocks of method 800 may be performed in parallel. For example, blocks 820 and 860 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

updating, by a processor, a highest grayscale value associated with a raw image data to a maximum grayscale value;

determining an expansion ratio based on the highest grayscale value and the maximum grayscale value;

modifying at least one grayscale value associated with the raw image data prior to display at a display panel, wherein the modifying of the at least one grayscale value is based on the expansion ratio; and adjusting a backlight intensity based on a quotient of the highest grayscale value divided by the maximum grayscale value, wherein the quotient is raised to a power of a gamma correction curve value to adjust a pixel transmittance of the display panel.

2. The method of claim 1, determining a pulse width modulation signal value for the adjusting of the backlight intensity.

3. The method of claim 1, wherein the adjusting of the backlight intensity includes minimizing the backlight intensity.

4. The method of claim 1, further comprising dividing the display panel into local area units.

5. The method of claim 1, further comprising dividing a backlight unit into local area units.

6. The method of claim 1, wherein the pixel transmittance is based on the gamma correction curve value.

7. The method of claim 1, wherein the pixel transmittance associated with the maximum grayscale value is one hundred percent.

8. The method of claim 1, wherein a value for the adjusting of the backlight intensity is queried from a lookup table.

9. An information handling system, comprising:

a processor; and a memory storing instructions that when executed cause the processor to perform operations including:

updating a highest grayscale value associated with a raw image data to a maximum grayscale value;

determining an expansion ratio based on the highest grayscale value and the maximum grayscale value;

modifying at least one grayscale value associated with the raw image data prior to display at a display panel, wherein the modifying of the at least one grayscale value is based on the expansion ratio; and adjusting a backlight intensity based on a quotient of the highest grayscale value divided by the maximum grayscale value, wherein the quotient is raised to a power of a gamma correction curve value to adjust a pixel transmittance of the display panel.

10. The information handling system of claim 9, wherein the operations further include determining a pulse width modulation signal value for the adjusting of the backlight intensity.

11. The information handling system of claim 9, wherein the adjusting of the backlight intensity includes minimizing the backlight intensity.

12. The information handling system of claim 9, wherein the operations further include dividing the display panel into local area units.

13. The information handling system of claim 9, wherein the adjustment of the pixel transmittance is based on the gamma correction curve value.

14. The information handling system of claim 9, wherein the pixel transmittance associated with the maximum grayscale value is one hundred percent.

15. A non-transitory computer-readable medium to store instructions that are executable to perform operations comprising:

updating a highest grayscale value associated with a raw image data to a maximum grayscale value;

determining an expansion ratio based on the highest grayscale value and the maximum grayscale value;

modifying at least one grayscale value associated with the raw image data prior to display at a display panel, wherein the modifying of the at least one grayscale value is based on the expansion ratio; and adjusting a backlight intensity based on a quotient of the highest grayscale value divided by the maximum grayscale value, wherein the quotient is raised to a power of a gamma correction curve value to adjust a pixel transmittance of the display panel.

16. The non-transitory computer-readable medium of claim 15, wherein the operations further include determining a pulse width modulation signal value for the adjusting of the backlight intensity.

17. The non-transitory computer-readable medium of claim 15, wherein the adjusting of the backlight intensity includes minimizing the backlight intensity.

18. The non-transitory computer-readable medium of claim 15, wherein the operations further include dividing the display panel into local area units.

19. The non-transitory computer-readable medium of claim 15, wherein the operations further include dividing a backlight unit into local area units.

20. The non-transitory computer-readable medium of claim 15, wherein the pixel transmittance is based on the gamma correction curve value.

* * * * *